Figure 1:
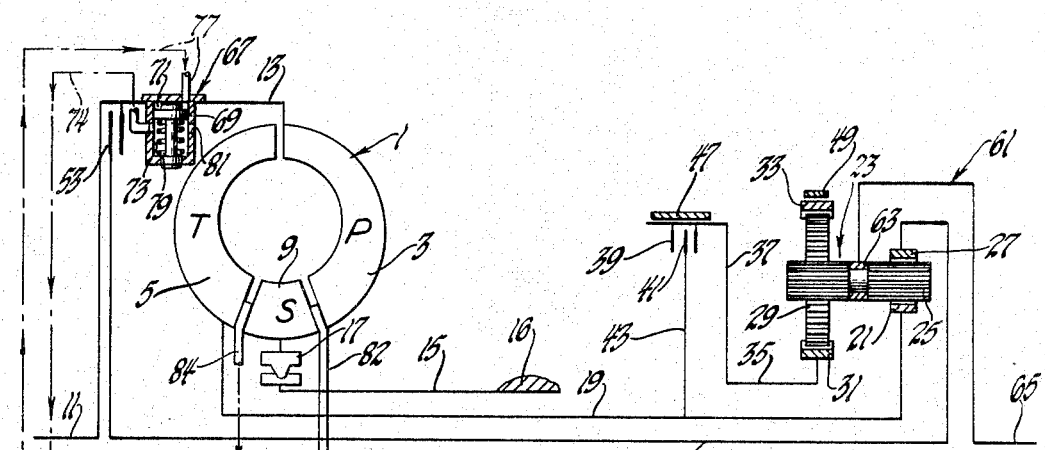

Dec. 5, 1967 B. F. BOEHM 3,355,966

POWER TRANSMISSION

Filed Aug. 10, 1964

INVENTOR.
Benjamin F. Boehm
BY
a. m. Heiter
ATTORNEY

3,355,966
POWER TRANSMISSION
Benjamin F. Boehm, Oak Park, Mich., assignor to General Motors Corporation, Detroit, Mich., a corporation of Delaware
Filed Aug. 10, 1964, Ser. No. 388,395
3 Claims. (Cl. 74—688)

This invention relates in general to power transmissions and more particularly to automatic transmissions incorporating a hydrodynamic torque converter and a multiratio gear unit to provide torque converter drives, split torque drives and direct mechanical drives.

In the modern internal combustion engine vehicle, it is necessary to multiply the torque of the engine to initially move the vehicle through its drive wheels. However, as the vehicle gains momentum, the requirement for torque multiplication varies and diminishes until a vehicle speed is reached where no torque multiplication is needed and overdrive is desirable. To provide for such varying torque requirements in modern vehicles, a power transmission incorporating a hydrodynamic torque converter coupled with multiratio gear unit is often employed. Such transmissions are connected between the vehicle engine, providing a power input, and the drive wheels of the vehicle. The dependability, efficiency, and success of these power tranmissions is witnessed by their widespread application in many varied types of vehicles.

To further increase the drive efficiency, it is desirable to provide an overdrive to obtain an increase in speed from the engine to the drive wheels when there is no need for full engine torque. Such overdrives reduce engine wear since the power transmission output will be rotating faster than the engine crankshaft and still produce the desired vehicle speed. Since the vehicle engine speed is slower, greater fuel mileage is obtained and engine vibrations are diminished resulting in greater passenger comfort.

Generally, these overdrives have heretofore been in the form of special planetary gear units attached directly to the output of the multiratio gear unit of the automatic transmission. These overdrive units have therefore added to the complexity and cost of the vehicle as well as maintenance costs.

This invention employs a torque converter unit with a bladed pump adapted to impel a vortex of hydraulic fluid against the blades of a turbine to drive the turbine and a stator located between the pump and turbine to redirect the vortex of hydraulic fluid from the turbine back into the pump at increased velocity. The torque converter is combined with a multiratio gear unit to provide for varying torques required in the efficient operation of the vehicle. In its preferred embodiment the multiratio gear unit has a compound planetary gear set having large and small sun gears, short planet gears which mesh with the small sun gear, long planet gears which mesh with the large sun gear and short planet gears, a large reverse ring gear meshing with the short planets and a smaller overdrive ring gear meshing with the long planet gears. A suitable carrier rotatably mounts the long and short planet gears in the planetary gear set and provides the output of the planetary gear set. Suitable braking structures, such as bands, are provided for the small sun gear to selectively hold this gear to provide proper gear ratio in the forward speeds when increased torque multiplication is desired, while a similar braking structure is provided for the large ring gear for reverse.

In a first embodiment for low, the turbine is connected directly to and drives the large sun gear of the planetary gear set through a suitable drive connection while the small sun gear is held to provide for carrier output with large gear reduction needed to initially move the vehicle.

For converter drive combined with direct drive in the gearing, the small sun gear is released from reaction and a clutch device is engaged to connect that sun gear with the turbine drive connection connecting the turbine and the large sun gear. This causes both sun gears to simultaneously rotate in the same direction locking the gear set as a unit and rotating the output carrier to the sun gears. An optional direct mechanical drive is obtained by clutching the sun gears for rotation together locking up the planetary gear set. The gear set is then driven as a unit by the input ring gear when connected directly to the input shaft by a suitable clutch. Reverse is obtained by braking the ring gear for the short planets and driving the large sun gear with the turbine. The short planets, actuated by the input gear, will walk around in the reaction ring gear in a reverse direction taking the output carrier in that direction. An overdrive in this embodiment is obtained without the addition of a special overdrive unit by braking the small sun gear and driving the long planet ring gear directly from the engine input through the second clutch as in direct drive with split torque. However, in overdrive the torque converter is evacuated by a special valve device to prevent it from retarding the movement of the carrier due to the fact that pump speed is greater than turbine speed. Overdrive is obtained as the short planet races around the reaction sun gear in a forward direction at a speed greater than the speed of the input ring gear.

A second embodiment is similar to the first embodiment described above. However, the clutch for the small sun gear of the planetary unit has been eliminated and a one-way clutch has been installed in the drive connection between the turbine and the large input sun gear. Additionally, a manually operable clutch has been installed in parallel with the one-way clutch to provide a positive connection between the torque converter and the planetary gear set. This manual clutch permits the vehicle to be started by pushing and is also useful in braking the vehicle with the engine. In manual low the manually operated clutch is applied and the small sun gear is held for reaction. Torque multiplication occurs as the short planets walk around the reaction sun gear in a clockwise direction when driven by the input sun gear and the intermediate long planets. In automatic low, the above-mentioned mechanical clutch is released and the small sun gear is held by a braking device. Torque converter input is applied to the large sun gear through the one-way clutch and torque multiplication occurs as the short planets walk around the reaction sun gear moving the carrier. In this second embodiment it is also possible to obtain a split torque drive with a substantially 1 to 1 drive ratio between input and output by clutching the input from the engine directly to the input ring gear while at the same time driving the large input sun gear by the turbine through the one-way clutch. Carrier output is obtained as the long planets rotate slowly and are carried around the input sun gear. In overdrive, obtained as described above in connection with the first embodiment; the smaller sun gear is held for reaction with direct mechanical input through the ring gear engaging the long planets. Overdrive is obtained as the carrier moves with the short planets as they race around the reaction sun gear. In this overdrive, evacuation of the converter is not necessary as in the first embodiment since the freewheel device will permit the large sun gear to overrun the turbine. Reverse is obtained as in the embodiment above, wherein the reverse ring gear is held for reaction and the short planets are rotated clockwise by the long planets driven by the input sun gear. Since the short planets walk counterclockwise in the reaction ring gear the carrier will be rotated in that direction.

A third embodiment of this invention is similar in structure and operation to the second embodiment described above. However, the direct mechanical drive to the input ring gear of the planetary gear unit has been eliminated and replaced by a drive actuated by the turbine of the torque converter.

An object of this invention is to provide a power transmission including a torque converter and a cooperating planetary gear set which is adapted to provide underdrives, intermediate drives, overdrive and reverse.

Another object of this invention is to provide a transmission having a planetary gear set which includes first and second input gear means, output means, means connecting the input means to the output means, and dual input drives with one of the input drives providing a torque path including a torque converter to the first input gear means, and the other of the input drives providing a torque path to the second input gear means to provide mechanical input independent of the torque converter.

Another object of this invention is to provide a torque converter transmission having a planetary gear set which includes input gear means, output means and reaction gear means which is braked to provide a ratio change, and an input drive providing a torque path and direct mechanical input to the input means independent of the torque converter.

A further object of this invention is to provide a transmission having a planetary gear set which includes input means and output means and reaction means with the input means formed by a ring gear adapted to be connected to and driven by a power source to obtain an overdrive gear ratio.

Another object of this invention is to provide a torque converter transmission including a planetary gear set for multiplying torque with an input sun gear connected to the turbine by a drive connection having a clutch means and a one-way clutch connected in parallel in the drive connection between the turbine and the input sun gear.

A further object of this invention is to provide a torque converter transmission including a compound planetary gear set having dual input gears, an output, and gear means connecting the dual input gears and dual input drives provided by a first drive through the torque converter to a first input gear and a second drive to provide a mechanical input independent of the torque converter which combine to form a split torque drive.

Another object of this invention is to provide a torque converter transmission having a compound planetary gear set with an input ring gear adapted to be connected to and driven by an input shaft and a reaction sun gear held to provide an overdrive.

These and other objects of this invention will become more apparent from the following specification and drawings showing the preferred embodiments of this invention.

Figure 2:
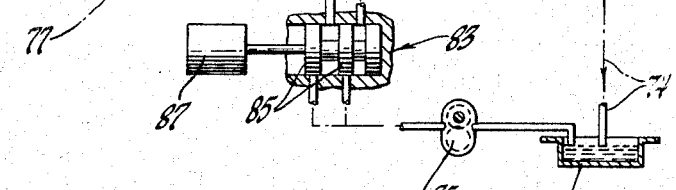
Figure 2:
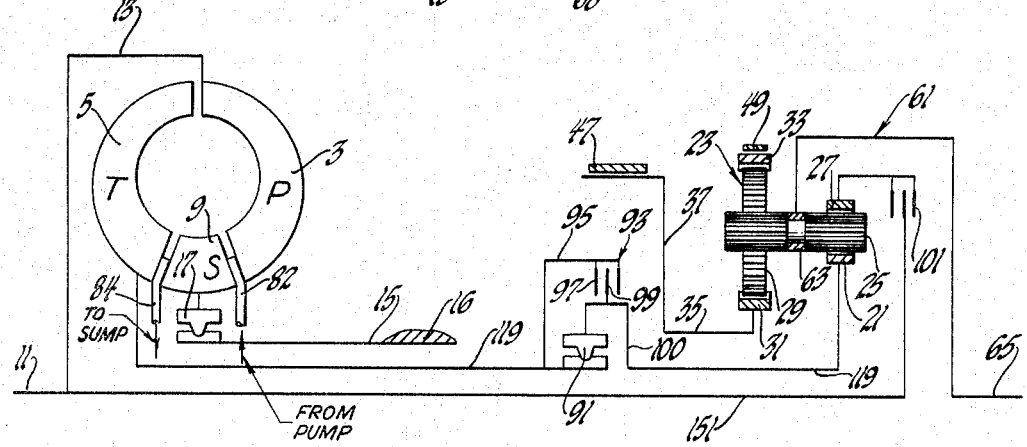
Figure 3:
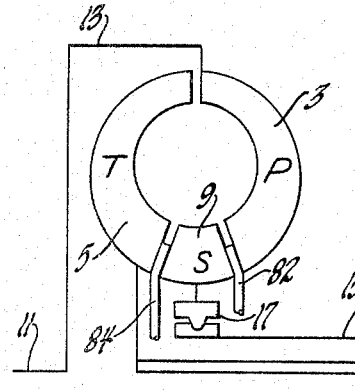

FIGURE 1 is a schematic view illustrating a transmission incorporating a turbine torque converter and a compound planetary gear set having a direct drive input ring gear, FIGURE 2 is a schematic view similar to FIGURE 1 illustrating a second embodiment of the present invention, and FIGURE 3 is a schematic view of a torque converter similar to that of FIG. 2 and illustrating a further embodiment of the present invention.

The transmission shown in FIG. 1 includes a torque converter 1 formed with a conventional bladed pump 3, a bladed turbine 5 and bladed stator 9. The pump is adapted to be rotatably driven by an engine input shaft 11 connected to the torque converter housing 13. Stator 9 is secured to ground sleeve 15 by one-way brake 17 which prevents stator rotation opposite to the forward direction of rotation of pump 3. The ground sleeve is fixed to transmission housing 16, as shown.

A drive connection or sleeve shaft 19, rotatable by turbine 5, is connected to the hub of the sun gear 21 of a torque-multiplying planetary gear set 23. The planetary gear set is formed with three long planets 25, rotatably mounted on a carrier, which mesh with the sun gear 21 and a surrounding ring gear 27. These long planets are further in meshing engagement near the ends thereof with three short planets 29 which in turn are rotatably mounted on the carrier and meshingly engage a second sun gear 31 and also a surrounding ring gear 33 which forms a part of the compound planetary gear set. The hub of the sun gear 31 is secured to a sleeve 35 of a rotatable housing 37. As illustrated, spaced clutch plates 39 splined on the rotary housing 37 are adapted to be selectively engaged by clutch plates 41 splined on the periphery of a disc member 43 which is fixed on and rotatable with the turbine sleeve shaft 19. The outer periphery of housing 37 is adapted to be contacted by brake band 47 to prevent rotation of the housing and the sun gear 31 while a second brake band 49 is adapted to selectively engage the outer periphery of ring gear 33 to prevent rotation of that gear, if desired. Ring gear 27 is connected by a drum to a direct drive shaft 51 which in turn is connected to the input 11 through a clutch 53 which provides direct rotation of the ring gear by the engine input shaft. The rotatable carrier shown schematically as element 61 is connected to the long planets 25 by collar 63 and to the short planets 29 by suitable pivot shafts, not shown. An output shaft 65 is fixed to the carrier and is adapted to be rotated therewith on rotation of the carrier by the movement of the planets in their orbits around their respective sun gears. The torque transmitted by the rotating shaft 65 can be applied to the drive wheels of a vehicle through suitable differential gearing which is not shown.

A valve 67 schematically illustrated in FIG. 1 is provided in the torque converter housing 13 to control the exhaust of hydraulic fluid in the converter to a sump 68 for a purpose which will appear below. This valve and connections to the sump are similar in construction and in operation to the valve and connections shown and disclosed in U.S. Patent 2,898,738 issued to D. R. Sand et al. As shown, the valve 67 includes a piston 69 dividing the valve chamber into first and second compartments 71 and 73. The first compartment 71 is connected to a fluid pressure source such as hydraulic pump 75 by fluid conduit 77 while conduit 74 connects the second compartment to sump 68. The piston 69 is adapted to be biased by a suitable coil spring 79 into contact with the interior of the housing 13. When so biased, as illustrated in FIG. 1, the piston is moved away from a port 81 leading into the chamber. This piston movement allows the fluid to be discharged from the converter through the valve chamber into conduit 74 leading into the sump. The piston 69 is also adapted to be acted upon by fluid pressure developed by pump 75 and supplied to one end of the valve chamber through the conduit 77. When sufficient fluid pressure is applied to the piston the force of spring 79 on piston 69 will be overcome and the piston will be moved inwardly to block port 81 to prevent evacuation of fluid from the torque converter.

To provide the necessary fluid for the operation of the torque converter, conduit 82 is utilized to connect the gear pump 75 to the converter while return conduit 84 connects the converter to the sump 68 through conduit 74. A valve 83 including a spool with lands 85 connected in conduits 77 and 82 is utilized to control the flow of fluid to the converter 1 and the valve 67. This valve is in turn controlled by movement of actuator 87. As shown, the lands block passages in the valve 83 leading to the pump 75 and prevent the hydraulic fluid pressure developed by the pump from reaching the piston 71 and the torque converter. In the valve position shown, the hydraulic fluid will be expelled from the converter to the sump through valve 67 and conduit 74. When the valve spool is moved to the left in FIG. 1 the conduits 82 and 77 are open to fluid pressure and piston 69 will be moved inwardly blocking port 81 to prevent exhaust of fluid to the sump through conduit 74. The turbine is then operative to transmit torque to the multiratio gear unit.

In the arrangement shown in FIG. 2, which is similar in construction to that of FIG. 1, with like parts being identified by like reference numerals, a freewheel device such as a one-way clutch 91 to connect the two portions of turbine sleeve shaft 119 extending between turbine 5 and sun gear 21. Also, a selectively operated clutch 93 has been similarly interposed in the turbine input shaft in parallel with the one-way clutch. As illustrated, one portion of the shaft carries a clutch housing 95 having integral clutch plates 97 splined thereon adapted to engage clutch plates 99 splined to a hub 100 integral with the other portion of the turbine sleeve shaft. To operatively connect the input ring gear to direct mechanical input, a second clutch 101 is disposed between the ring gear 27 and the direct drive shaft 151.

It will be appreciated that the clutches 53 and 39 of FIG. 1 construction have been eliminated in the construction of FIG. 2 since they are unnecessary in the operation of FIG. 2, as described below. Also, the means of FIG. 1 for evacuating the torque converter have been eliminated from the construction of FIG. 2 since evacuation of the torque converter is not necessary to obtain mechanical overdrive as in the embodiment of FIG. 1.

In the modification of FIG. 3, which is similar in construction to FIG. 2, with like parts being identified by like reference numerals, shaft 251 is driven directly by turbine 5 instead of being directly driven by input shaft 11. The planetary gear unit and the same clutches and brakes of FIG. 2 are combined with the torque converter of FIG. 3 so that the turbine 5 drives the input ring gear 27 through the shaft 251 and when clutch 101 is engaged.

The torque converter in itself is conventional and operates in a conventional manner briefly described below. As shown in FIG. 1, the bladed torque converter pump 3 is attached to the engine input shaft 11 through the torque converter housing 13 and is adapted to be driven by that shaft. The centrifugal force developed by the pump when rotated throws the hydraulic fluid out of openings formed by its blade near its rim into similar openings formed by the blades of the turbine. This fluid travels in a vortex and is returned to the pump by the blades in the stator 9 which is held from rotation by the one-way brake 17. The returning fluid adds its velocity to the velocity of the fluid developed by the pump. By this regenerative means sufficient velocity is obtained to rotate the turbine and drive shaft 51 for torque multiplication. Increases in pump speed result in increases in turbine speed. As turbine speed approaches pump speed, torque multiplication decreases and the fluid flow is rotary providing a fluid coupling with a 1:1 input to output ratio.

OPERATION—FIGURE 1

In the structure shown in FIG. 1 the brake band 47 is applied for underdrive or low-range operation. On application of band 47 the sun gear 31 becomes a reaction member for the planetary gear set. The turbine 5 when driven by input shaft 11 drives sun gear 21 in a clockwise direction which, in turn, rotates the long planets 25 counterclockwise. The long planets will then rotate the short planets 29 clockwise and the short planets will walk around the reaction sun gear 31 in clockwise direction. Thus, the short planets and the long planets and their carrier 61 rotate around the input sun gear 21 with an increased torque applied to the output shaft. This underdrive provides torque multiplication in the converter and in the gear unit.

In direct drive, utilized when the vehicle is moving and the requirement for torque multiplication has diminished, the clutch 41 is applied and the sun gears 31 and 21 are simultaneously driven by the turbine output shaft 19. When these two gears rotate in the same direction, the long and short planets lock up and are carried as a unit with their respective ring gears with the sun gears. With this arrangement, the torque converter provides torque multiplication and the gear unit provides 1:1 drive.

With the transmission of FIG. 1 described above, it is also possible to obtain an optional direct mechanical drive with a 1:1 drive ratio. This is accomplished by engaging clutches 53 and 41. With clutch 53 engaged, ring gear 27 is driven in the forward direction by the drive shaft 51 connected directly to input shaft 11 by the clutch 53. However, since clutch 41 has also been applied the gears of the planetary unit are locked and there is a direct or 1:1 solid mechanical drive from input to output. During this drive the torque converter does not transmit torque but may remain filled since the pump and turbine are rotating at the same speed.

When overdrive is desired clutch 53 and brake band 47 are applied. This results in direct mechanical input into the planetary gear drive unit through ring gear 27 with reaction provided by sun gear 31. With the sun gear 31 held and with planets 29 and 25 supported on the common carrier 61, planet 29 rapidly rotates and orbits in a forward direction around the reaction sun gear 31. Planets 25 rotate in an opposite direction to planets 29 and at a slower speed orbiting within ring gear 27 and in a forward direction. This rotates the common carrier in a forward direction, the planets 25 under these conditions will race ahead of the slower input ring gear. Since the ratio of pump speed to turbine speed is about 1.45 to 1 in overdrive, it is necessary to evacuate the torque converter to prevent the input sun gear from retarding the rotation of the planetary gears. The torque converter of FIG. 1 is evacuated in overdrive by movement of the lands 85 to cut off the supply of fluid to valve 67 and the torque converter. When fluid pressure is removed from piston 69, the valve is opened by movement of the piston and the converter fluid exhausts into the sump 68.

In reverse, brake 49 is applied to the ring gear 33. The turbine drives sun gear 21 in a forward direction which in turn drives planet 25 in an opposite direction. The large planet 29 which meshes with the short planet is driven thereby and rotates in the same direction as sun gear 21 and walks counterclockwise in the reaction ring gear 33 at a reduced speed and carries the common carrier 61 in that direction. Output 65 is thereby rotated in a direction opposite to the direction of input shaft 11.

OPERATION—FIGURE 2

In the structure shown in FIG. 2, the clutch 97, one-way clutch 91 and brake 47 are applied for manual low. When turbine 5 is rotated, clockwise rotation of sleeve shaft 119 and sun gear 21 connected thereto will occur. Rotation of the sun gear 21 causes the planets 25 to rotate about their axes in a reverse direction. Planets 25 in turn rotate meshing planets 29 in a clockwise direction. A gear reduction takes place as planets 29 walk clockwise around the reaction sun gear 31 taking the planet carrier 61 with them at a reduced speed. Output shaft 65 connected thereto then rotates at a reduced speed transferring the increased torque to the vehicle drive wheels which are not shown. This torque multiplication is used to initially move the vehicle or when exceptional performance is demanded, such as in situations where mud, deep sand, snow and long, steep hills are encountered. Since, in manual low, clutch 93 connects the input sun gear 21 to the turbine 5, the torque converter can be effectively used to obtain engine braking when descending steep hills and can also be used for vehicle starting by pushing, if necessary.

In automatic low, one-way clutch 91 and brake 47 are still applied; clutch 97 is released and sun gear 31 is held for reaction by brake 47. When turbine 5 transmits torque to the sleeve shaft 119 the sun gear 21 will be rotated clockwise. The long planets 25 will then be rotated in a counterclockwise direction and the short planets 29 meshing therewith will rotate clockwise and walk clockwise around the reaction sun gear at a reduced speed. The carrier 61 for the planet gears then rotates at a speed less than that of the input sun gear 21 and the planetary gear train functions as a torque-increasing, speed-reducing unit.

In direct drive, the clutch 101 and normally one-way clutch 91 are engaged. The turbine 5 when rotated will rotate sleeve shaft 119 and the input sun gear 21 in a clockwise direction while direct mechanical drive will come from input shaft 11 through shaft 151 and clutch 101 to rotate ring gear 21 clockwise. It will thus be seen that there will be split torque input with the engine torque applied to ring gear 27 and converter torque applied to sun gear 21, causing both gears to rotate forwardly. Since the ring gear 27 will be rotating slightly faster than the sun gear 21 the long planets will be carried by these rotating gears and will also rotate slowly in the forward direction walking around the rotating sun gear. The planet carrier which is attached to and carried by the planets rotates clockwise rotating the output shaft 25 substantially in a 1:1 input-to-output ratio.

In overdrive, when it is desired to have the output shaft 65 rotating faster than input shaft 11, clutch 101 and brake 47 are applied. The ring gear 27 is connected through the clutch 101 and shaft 151 directly to drive shaft 11. With the sun gear 31 held securely by brake 47 the short planets will rotate rapidly in a clockwise direction and race around the reaction sun gear. Planet 25 will turn slowly counterclockwise while orbiting clockwise around sun gear 21. The carrier for the planets is rotated in a clockwise direction and rotates faster than the input ring gear 27. The output shaft 65 attached to the carrier is rotated thereby faster than the rotation of input shaft 11.

To obtain reverse, the reverse ring gear 33 is held by brake band 49. Turbine 5, through one-way clutch 91 and clutch 93 which are engaged and shaft 119, rotates sun gear 21 clockwise. Planets 25, rotated thereby in a reverse direction, rotate meshing short planets 29 clockwise. The short planets 29 then walk counterclockwise in the reaction ring gear, producing a gear reduction and moving carrier 61 in that direction. The output shaft 65 attached to the carrier 61 is then rotated in a reverse direction.

OPERATION—FIGURE 3

It is anticipated that the planetary gear unit of FIG. 2 with its brakes and clutches can be employed with the torque converter of embodiment of FIG. 3. If a solid overdrive with the converter locked out, such as in structure of FIGS. 1 and 2 above, is not desired the overdrive ring gear 27 may be driven by the turbine. As illustrated in FIG. 3, the drive shaft 251 is connected to the turbine 3 for rotation therewith.

When clutch 101 is engaged the turbine 5 will drive the ring gear 27 clockwise. If the sun gear 31 is held for reaction by brake 47, the planets will orbit rapidly around the reaction sun gear rotating carrier 61 faster than the input ring gear is rotating. Since the output shaft 65 attached to the carrier will be rotating faster than the input shaft 11, overdrive is obtained.

The underdrives and the reverse drive which can be obtained with the embodiment of FIG. 3 are identical to that of FIG. 2, and the description thereof is the same as the description of these FIG. 2 drives. Direct drive is similar to that of FIG. 2 with one-way brake 91 and clutch 101 engaged. However, in FIG. 3 direct drive, all torque is through the converter.

From the above description of the preferred embodiments of this invention, it will be understood that applicant has provided a power transmission which incorporates a torque converter and a single compound planetary gear set having independent ratio steps which provides: underdrives when torque multiplication is needed, normal drives including converter drives and combined converter and direct mechanical drives when higher speeds are desired and greater torque multiplication is not needed, direct mechanical and torque converter overdrives, as well as reverse drives.

It will be understood that the invention can be modified beyond the illustrated embodiments, and therefore any limitations to be imposed are those set forth in the following claims.

I claim:

1. In a power transmission a power input means and output means, a hydrodynamic torque converter, said torque converter including a pump operatively connected to said input means and a turbine and a stator, a planetary gear set having first and second sun gears, first planet gears meshing with said first sun gear, second planet gears meshing with said second sun gear and said first planet gears, a ring gear meshing with said first planet gears, a carrier rotatably supporting said first and second planet gears, means connecting said carrier to said output means, a first drive shaft for transmitting torque from said turbine to said first sun gear, selectively engageable friction means to retard rotation of said second sun gear to condition said planetary gear set for underdrive when said first sun gear is driven by said turbine, a second torque transmitting drive shaft connected to said input means for transmitting torque from said input means to said ring gear, selectively engageable friction means operatively connected to said second torque transmitting drive shaft engageable to connect said second drive shaft and said ring gear, said first selectively engageable friction means being operative when applied to retard rotation of said second sun gear to condition said planetary gear set for overdrive when said last recited friction means is engaged and said input means drives said ring gear, and one-way friction means in said first drive shaft to prevent said turbine from retarding rotation of said first sun gear and said output member when said planetary gear set is conditioned for overdrive.

2. The transmission defined in claim 1 and further including a selectively engageable friction device operatively connected to said first drive shaft in parallel with said one-way friction means engageable to enable said output means to be utilized to drive said turbine.

3. In a power transmission, input means and output means, a torque converter, said torque converter including a pump operatively connected to said input means and a turbine and a stator, a planetary gear set having first and second sun gears, first planet gears meshing with said first sun gear, second planet gears meshing with said second sun gear and said first planet gears, a ring gear meshing with said first planet gears, a carrier rotatably supporting said first and second planet gears, means connecting said carrier to said output means, a first drive shaft connected to said turbine for transmitting torque from said turbine to said first sun gear, selectively engageable friction means to retard rotation of said second sun gear to condition said planetary gear set for overdrive when said first sun gear is driven by said turbine, a second torque transmitting drive shaft connected to said turbine for transmitting torque from said turbine to said ring gear, selectively engageable friction means operatively connected to said second torque transmitting drive shaft engageable to connect said second drive shaft and said ring gear, said first selectively engageable breaking means being operative when applied to retard rotation of said second sun gear to condition said planetary gear set for overdrive when said turbine drives said ring gear, one-way friction means in said first drive shaft engageable to transmit torque from said turbine to said first sun gear for direct drive and automatically disengageable to prevent said turbine from retarding rotation of said first sun gear when said planetary gear set is conditioned for overdrive and a selectively engageable friction means operatively connected to said first drive shaft in parallel with said one-way friction means to permit said output to be used to drive said turbine.

References Cited

UNITED STATES PATENTS

| | | | |
|---|---|---|---|
| 2,736,407 | 2/1956 | Smirl | 74—688 |
| 2,901,923 | 9/1959 | Waclawek | 74—761 X |
| 2,919,606 | 1/1960 | Karcsson et al. | 74—688 |
| 2,932,220 | 4/1960 | Nash | 74—688 X |
| 2,937,543 | 5/1960 | Forster | 74—688 |
| 2,959,984 | 11/1960 | Wickman | 74—688 |
| 2,997,896 | 8/1961 | Preston | 74—688 |
| 3,024,668 | 3/1962 | Kronogard et al. | 74—688 |
| 3,055,232 | 9/1962 | Dodge | 74—688 X |
| 3,106,107 | 10/1963 | Hardy | 74—763 X |
| 3,108,495 | 10/1963 | Winchell | 74—761 |
| 3,158,040 | 11/1964 | Moore | 74—159 X |
| 3,188,885 | 6/1965 | Fisher | 74—761 X |
| 3,188,886 | 6/1965 | Jandesek | 74—688 |
| 3,237,482 | 3/1966 | General et al. | 74—688 |
| 3,241,398 | 3/1966 | Simpson et al. | 74—688 |
| 3,277,744 | 10/1966 | Stockton | 74—688 |

DONLEY J. STOCKING, *Primary Examiner.*

DAVID J. WILLIAMOWSKY, *Examiner.*

J. R. BENEFIEL, T. C. PERRY, *Assistant Examiners.*